(12) United States Patent
Yamamoto

(10) Patent No.: US 10,509,387 B2
(45) Date of Patent: Dec. 17, 2019

(54) CONTROL DEVICE FOR MACHINE TOOL PERFORMING OSCILLATION CUTTING

(71) Applicant: FANUC CORPORATION, Yamanashi (JP)

(72) Inventor: Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/040,545

(22) Filed: Jul. 20, 2018

(65) Prior Publication Data

US 2019/0033816 A1    Jan. 31, 2019

(30) Foreign Application Priority Data

Jul. 27, 2017 (JP) .................................. 2017-145470

(51) Int. Cl.
*G05B 19/18* (2006.01)

(52) U.S. Cl.
CPC .. *G05B 19/182* (2013.01); *G05B 2219/33034* (2013.01); *G05B 2219/45044* (2013.01)

(58) Field of Classification Search
CPC .................. G05B 19/182; G05B 2219/45044
See application file for complete search history.

(56) References Cited

U.S. PATENT DOCUMENTS

2018/0281139 A1* 10/2018 Yamamoto ........... G05B 19/182
2018/0299857 A1* 10/2018 Oho ....................... G05B 19/25

FOREIGN PATENT DOCUMENTS

| JP | 2006-172149 A | 6/2006 |
| JP | 5033929 B1 | 9/2012 |
| JP | 5139592 B1 | 2/2013 |
| JP | 5599523 B1 | 10/2014 |
| JP | 6001720 B1 | 10/2016 |
| JP | 2017-56515 A | 3/2017 |
| WO | 2016/047485 A1 | 3/2016 |

* cited by examiner

*Primary Examiner* — Mark A Connolly
(74) *Attorney, Agent, or Firm* — Hauptman Ham, LLP

(57) ABSTRACT

A control device includes a command block timing detection unit for detecting arbitrary timing between adjacent command blocks, based on a machining program, which includes a plurality of command blocks, of a machine tool. A feed axis control unit includes a learning controller, and a determination unit that determines whether or not a current time is in the arbitrary timing between the adjacent command blocks, and stops oscillation of at least one feed axis based on the determination.

13 Claims, 12 Drawing Sheets

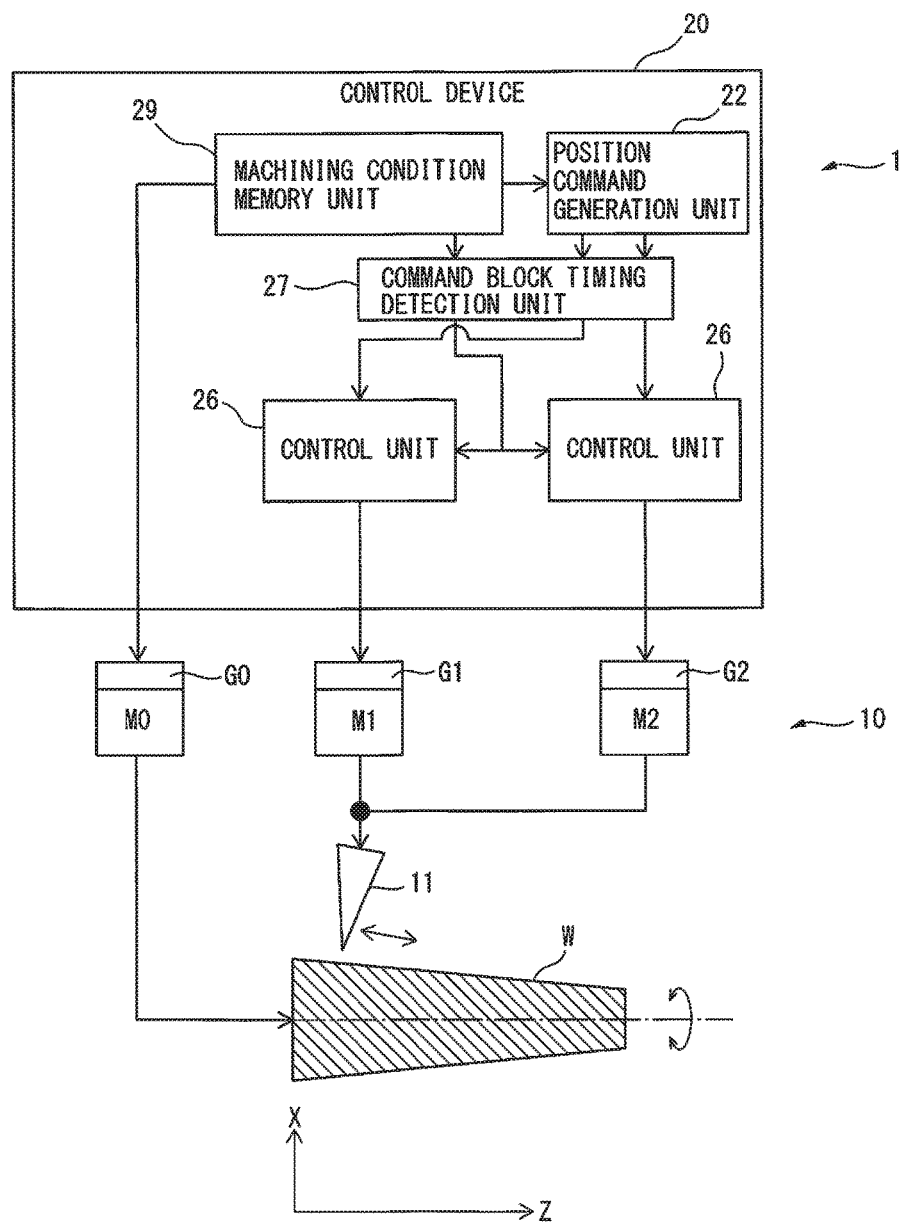

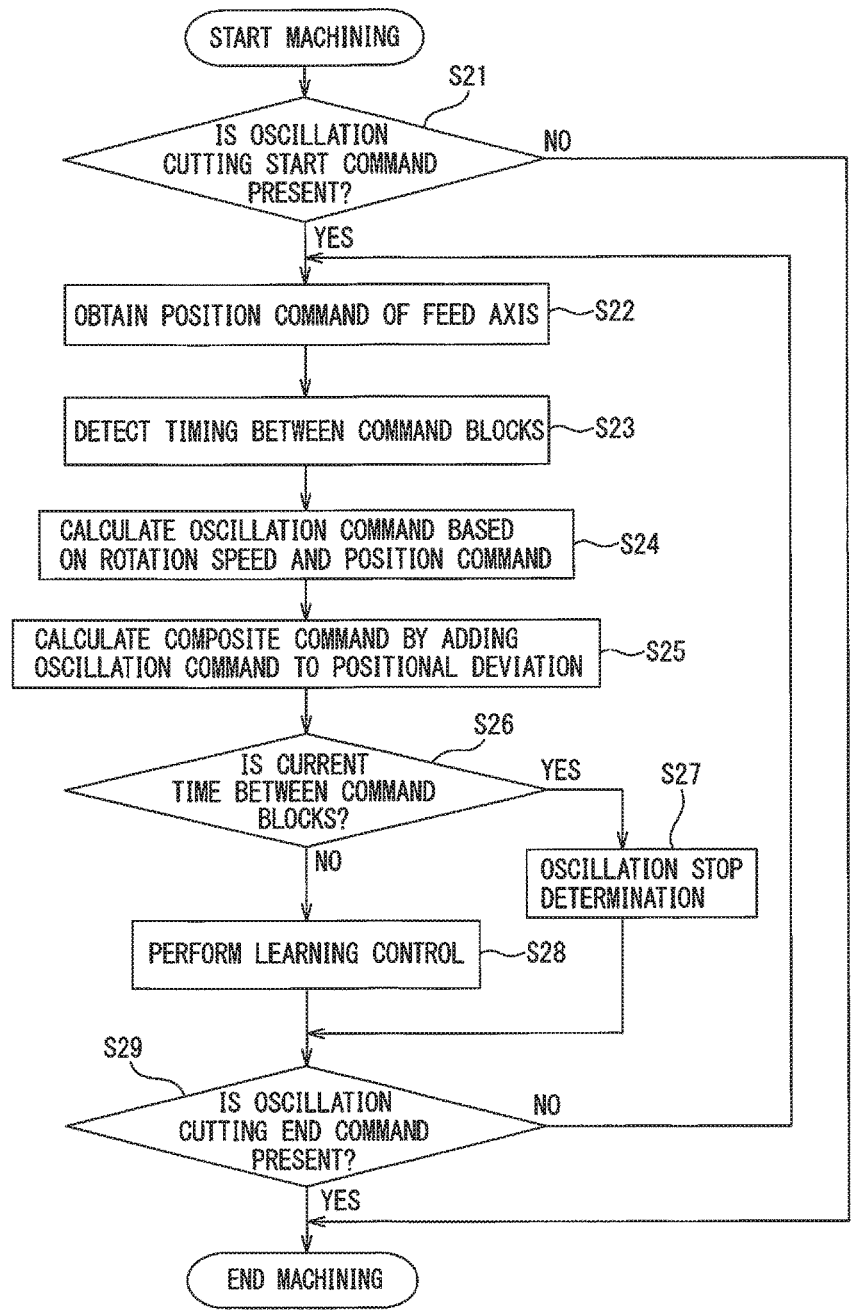

CONTROL DEVICE FOR MACHINE TOOL PERFORMING OSCILLATION CUTTING

RELATED APPLICATIONS

The present application claims priority of Japanese Application No. 2017-145470, filed Jul. 27, 2017 the disclosure of which is hereby incorporated by reference herein in its entirety.

BACKGROUND OF THE INVENTION

1. Field of the Invention

The present invention relates to a control device for a machine tool that performs oscillation cutting.

2. Description of Related Art

When workpieces are machined by cutting tools of machine tools, the cutting tools may be fouled with continuously produced cutting chips. In these instances, the machine tools need to be stopped to remove the cutting chips from the cutting tools, thus causing time loss and a reduction in production efficiency. Furthermore, since the cutting chips may damage the workpieces, the workpieces may have reduced quality.

To avoid this defect, oscillation cutting in which a cutting tool and a workpiece are relatively oscillated in a machining feed direction, in order to shred cutting chips, is known (for example, refer to Japanese Patent Nos. 5033929, 5139592, 5599523, and the like).

In the oscillation cutting, a technique in which an oscillation amplitude of a cutting tool is reduced as the cutting tool approaches a specific machining stop position in a workpiece in a machining feed direction is proposed, in order to prevent the defect that the cutting tool cuts in the workpiece beyond the certain machining stop position (for example, refer to International Publication No. 2016/047485). This defect is hereinafter referred to as overshoot.

In machine tools, learning control is proposed in order to increase position accuracy of objects driven by servomotors, such as a cutting tool and a workpiece (for example, refer to FIG. 6 of Japanese Unexamined Patent Publication (Kokai) No. 2006-172149). The learning control uses a command to make the driven object repeat an operation of the same pattern in predetermined cycles. While a correction amount to correct a positional deviation, i.e. the difference between a position command value and a position feedback value, is calculated in the predetermined cycles, the correction amount calculated in the preceding cycle is applied to the positional deviation. By repeatedly performing the learning control on the cyclic operation of the same pattern, a correction amount to converge the positional deviation to zero can be obtained.

In the above-described machine tool that performs the oscillation cutting, when a drive mechanism for a cutting tool or a workpiece has a backlash, or when the drive mechanism has low stiffness, a control gain is set high to improve servo responsiveness. However, since the high control gain causes occurrence of vibration, position accuracy of the cutting tool or the workpiece becomes unstable. In this case, even though the servo responsiveness is difficult to improve, applying learning control to the oscillation cutting allows control of a cyclic operation command to relatively oscillate the cutting tool or the workpiece in a machining feed direction, with high accuracy.

SUMMARY OF THE INVENTION

By the way, machining programs of machine tools each include a plurality of command blocks. Since machining conditions vary between adjacent command blocks, applying machine learning to oscillation cutting causes an overshoot and a tracking delay, and results in the occurrence of a cut in workpieces.

Therefore, a control device for a machine tool that can prevent the occurrence of a cut, even when machine learning is applied to oscillation cutting, is desired.

A first aspect of the present disclosure may be a control device for controlling a machine tool for machining an outer peripheral surface or an inner peripheral surface of a workpiece using a tool. The machine tool includes a main spindle for relatively rotating the workpiece and the tool about a central axis line of the workpiece, and at least one feed axis for relatively feeding the tool and the workpiece along a generatrix of the outer peripheral surface or the inner peripheral surface of the workpiece. The control device includes a position command generation unit for generating a position command for the feed axis based on a relative rotation speed between the workpiece and the tool and a relative feed speed between the tool and the workpiece, and a feed axis control unit for controlling the feed axis by the position command. The feed axis control unit includes an oscillation command generation unit for generating an oscillation command for the feed axis based on the rotation speed and the position command, such that an oscillation frequency becomes a positive non-integer multiple of the rotation speed, and such that the tool intermittently machines the workpiece. The feed axis control unit controls the feed axis based on a composite command obtained by adding the oscillation command to a positional deviation that is a difference between the position command and an actual position of the feed axis. The control device further includes a command block timing detection unit for detecting arbitrary timing between adjacent command blocks, based on a machining program, including a plurality of command blocks, of the machine tool. The feed axis control unit further includes a learning controller for performing learning control in which a correction amount of the composite command is calculated based on an oscillation phase calculated from the oscillation command, and the composite command, and the correction amount is added to the composite command; and a determination unit for determining whether or not a current time is in the arbitrary timing between the adjacent command blocks, and for stopping oscillation of the feed axis based on the determination.

According to the first aspect, since the oscillation is stopped when the current time is in the arbitrary timing between the command blocks, neither overshoot nor tracking delay occurs. Therefore, it is possible to prevent the occurrence of a cut in the workpiece.

The objects, features, and advantages and other objects, features, and advantages of the present invention will be more apparent from the following detailed description of typical embodiments of the present disclosure, relating to the accompanying drawings.

BRIEF DESCRIPTION OF THE DRAWINGS

FIG. 3 is a drawing of another machining system including a control device according to an embodiment;

FIG. 10 is a flowchart illustrating an example of the operation of the control device illustrated in FIG. 6;

DETAILED DESCRIPTION

Figure 1:
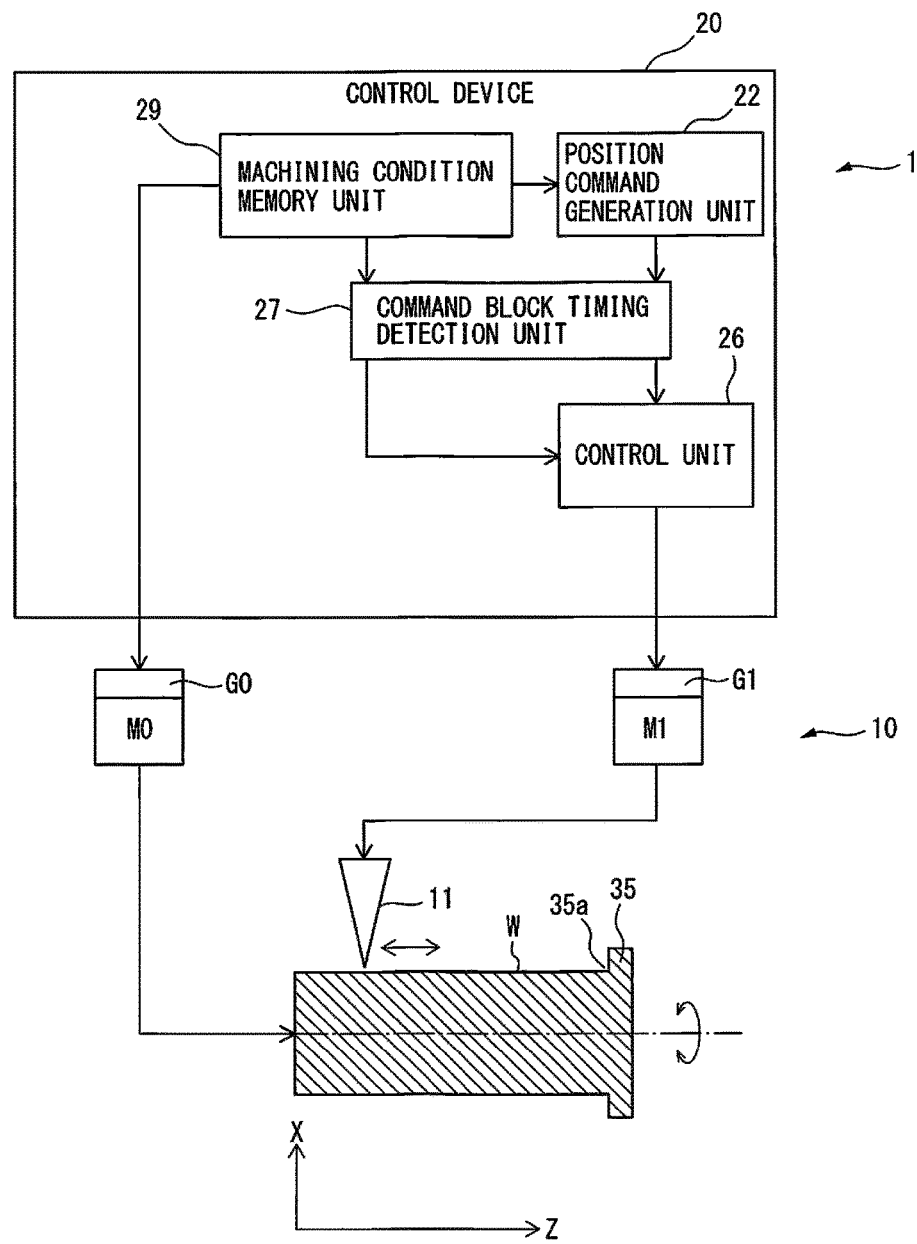
FIG. 1 is a drawing of a machining system including a control device according to an embodiment.

Embodiments of the present disclosure will be described with reference to the drawings. In the reference drawings, the same configuration components or functional components are indicated with the same reference numerals. For ease of understanding, the scales of the drawings are appropriately modified. Embodiments illustrated in the drawings are just examples to embody the present invention, and the present invention is not limited to the illustrated embodiments.

FIG. 1 is a drawing of a machining system 1 including a control device 20 according to an embodiment. As illustrated in FIG. 1, the machining system 1 includes a machine tool 10 and the control device 20 for controlling the machine tool 10. The machine tool 10 has a tool 11. The tool 11 cuts a workpiece in the shape of, for example, a cylinder, a cylindrical column, a cone, a circular truncated cone, or the like. In the example of FIG. 1, the tool 11 cuts an outer peripheral surface of a cylindrical column portion of a workpiece W, which mainly has the shape of a cylindrical column. In FIG. 1 and the like, a central axis line of the workpiece, which serves as a rotation axis of the workpiece, is defined as a Z axis. An axis perpendicular to the Z axis is defined as an X axis. By appropriately adjusting the position of the tool 11 in the direction of the X axis, the machine tool 10 can cut an outer peripheral surface or an inner peripheral surface of a columned workpiece having the shape of an ellipse in cross section.

In FIG. 1, the workpiece W is substantially in the shape of a cylindrical column having a projection 35, protruding outward in a radial direction of the workpiece W, at an end portion of the outer peripheral surface of the workpiece W. A main spindle M0 of the machine tool 10 rotates the workpiece W about its central axis line. A feed axis M1 of the machine tool 10 can feed the tool 11 along a generatrix of the outer peripheral surface of the workpiece W, as well as reciprocate, i.e. oscillate, the tool 11 along the generatrix of the outer peripheral surface of the workpiece W. In the case of the workpiece having the shape of FIG. 1, the tool 11 is fed along a generatrix of the outer peripheral surface of the cylindrical column portion, which occupies most of the workpiece W.

The feed axis M1 includes a feed mechanism for feeding the tool 11, and a servomotor for driving the feed mechanism. The feed axis M1 feeds the tool 11 to cut the workpiece W, in conjunction with the main spindle M0. Although torques required of the main spindle M0 and the feed axis M1 can be estimated from inertia and an angular acceleration of a command, except for a cutting load, detectors G0 and G1 may be provided to detect the torques.

The control device 20 is configured using a computer that includes memories such as a ROM (read only memory) and a RAM (random access memory), a CPU (central processing unit), and a communication control unit connected to each other through a bus. Furthermore, the control device 20 includes a position command generation unit 22, a control unit 26 (feed axis control unit), a command block timing detection unit 27, and a machining condition memory unit 29. The function or operation of each of the components can be achieved by cooperation of the CPU, the memories, and control programs stored in the memory.

In the control device 20, the machining condition memory unit 29 stores at least machining conditions of the workpiece W. A host computer (not illustrated), such as a CNC (computer numerical controller) or a PLC (programmable logic controller), is connected to the control device 20, and the machining conditions may be inputted from the host computer to the machining condition memory unit 29. The machining conditions of the workpiece W includes the rotation speed of the workpiece W, the feed speed of the tool 11, and a machining end point in the workpiece W. The machining condition memory unit 29 stores a machining program to be executed by the machine tool 10. The CPU of the control device 20 may read the rotation speed of the workpiece W and the feed speed of the tool 11 from the machining program, and output the rotation speed of the workpiece W and the feed speed of the tool 11 to the position command generation unit 22 and the control unit 26. The machining condition memory unit 29 and the position command generation unit 22 may be provided in the host computer, instead of in the control device 20. The machining program has a plurality of commands, and each of the commands is referred to as a command block. In general, each line of the machining program corresponds to one command block. Thus, the machining program has a plurality of command blocks.

The position command generation unit 22 of the control device 20 has the function of generating a position command for the feed axis M1, based on the relative rotation speed between the workpiece W and the tool 11 about the central axis line, and the relative feed speed between the tool 11 and the workpiece W. The position command is a command for the control unit 26 to designate a target position to which the tool 11 and the workpiece W is relatively fed in the direction of the Z axis.

The control unit 26 of the control device 20 has an oscillation command generation unit 23 (refer to FIG. 6) that generates an oscillation command for the feed axis M1, based on the rotation speed and the position command, such that an oscillation frequency becomes a positive non-integer multiple of the rotation speed and the tool 11 intermittently cuts the workpiece W. The oscillation command is a cyclic command asynchronous to the rotation speed about the central axis line. The oscillation command includes an oscillation frequency and an oscillation amplitude. The oscillation frequency corresponds to a value of the term of S/60×I in Equation (1) of the oscillation command, as described later, and the oscillation amplitude corresponds to a value of the term of K×F/2 in Equation (1).

The intermittent cutting denotes that the tool 11 cuts the workpiece W, while cyclically contacting and separating the workpiece W. The intermittent cutting is also referred to as oscillation cutting or vibration cutting. In FIG. 1, the workpiece W rotates, while the tool 11 oscillates relative to the workpiece W. However, the tool 11 may rotate about the central axis line of the workpiece W, while the workpiece W may oscillate relative to the tool 11. In FIG. 1, the feed axis M1 performs both of a feed operation and an oscillation operation of the workpiece W. However, the feed operation and the oscillation operation of the workpiece W may be performed by separate axes.

The command block timing detection unit 27 of the control device 20 detects arbitrary timing between adjacent command blocks in the machining program stored in the machining condition memory unit 29. In each command block, the machine tool 10 starts accelerating. Upon completing the acceleration, the machine tool 10 moves at a uniform speed. The machine tool 10 then starts decelerating, and stops at a command position. For example, the command block timing detection unit 27 may detect arbitrary timing between the start of deceleration in an anterior command block of the adjacent command blocks and the completion of acceleration in a posterior command block. Furthermore, the command block timing detection unit 27 notifies a determination unit 31, which will be described later, of the detected arbitrary timing. The command block timing detection unit 27 may be included in the not-illustrated host computer.

Furthermore, the control unit 26 of the control device 20 has the function of controlling the feed axis M1 based on a composite command (e.g. a position command value), which is obtained by adding the above-described oscillation command to a positional deviation, i.e. the difference between the above-described position command and the actual position of the feed axis M1. The actual position of the feed axis M1 corresponds to a position feedback value obtained by a position detector (not illustrated), such as an encoder installed in the feed axis M1.

The control unit 26 has the function of performing learning control in which a correction amount of a composite command is calculated based on an oscillation phase calculated from an oscillation command and the composite command, and the correction amount is added to the composite command. This function corresponds to a learning controller 30 (refer to FIG. 6), which will be described later.

Figure 2:
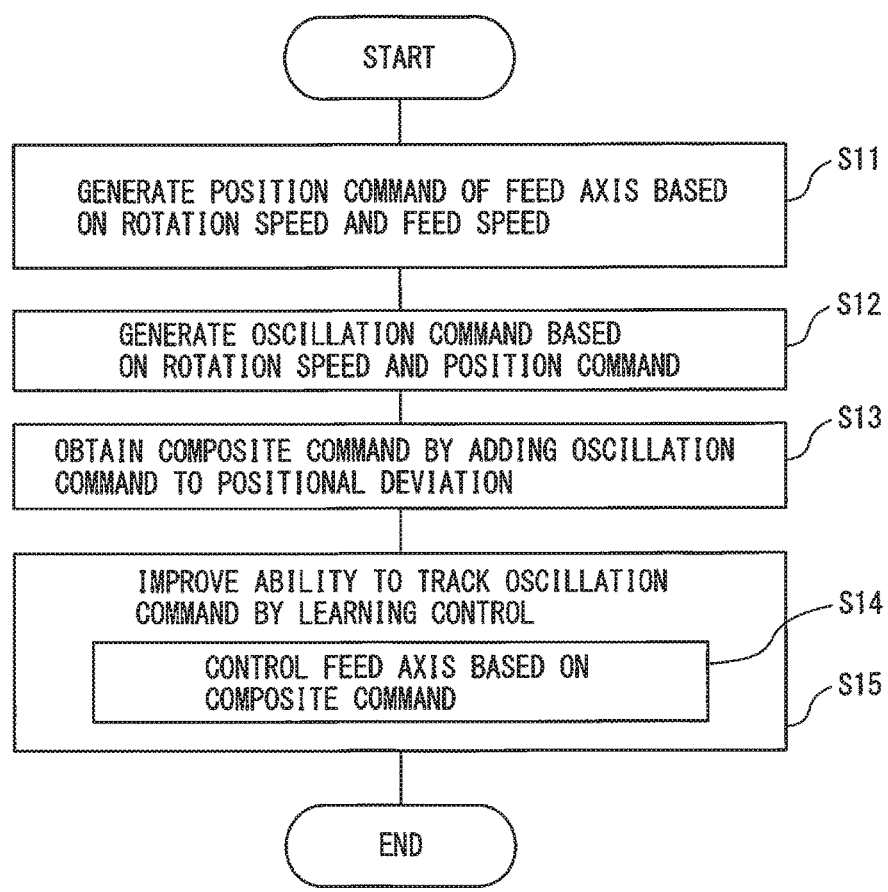
FIG. 2 is a flowchart of the operation of a control device according to an embodiment.

FIG. 2 is a flowchart of the operation of a control device 20 according to an embodiment. First, in step S11 of FIG. 2, a position command generation unit 22 generates a position command of a feed axis M1 based on the rotation speed of a workpiece W and the feed speed of a tool 11 stored in a machining condition memory unit 29.

In step S12, an oscillation command generation unit 23 (refer to FIG. 6) of a control unit 26 generates an oscillation command based on the rotation speed and the position command. In the example of FIG. 1, since the tool 11 oscillates only along the central axis line of the workpiece W, an oscillation command only for the feed axis M1 is generated.

FIG. 3 is a drawing of another machining system including a control device 20 according to an embodiment. In the example of FIG. 3, a workpiece W having the shape of a circular truncated cone is disposed. In this case, a tool 11 cuts an outer peripheral surface of the workpiece W, while the tool 11 oscillates along a generatrix of the outer peripheral surface of the workpiece W in an oblique direction. Since the tool 11 moves to a composite direction of an X axis and a Z axis, two feed axes M1 and M2 and two control units 26 each for each feed axis are required to move the tool 11. The feed axis M2 also includes a feed mechanism and a servomotor for driving the feed mechanism. The feed axes M1 and M2 feed the tool 11 to cut the workpiece W, in conjunction with a main spindle M0. In this case, in step S12, oscillation command generation units 23 of the control units 26, for the individual feed axes M1 and M2, generate oscillation commands for the two feed axes M1 and M2.

Although a torque required of the feed axis M2 can be estimated from inertia and an angular acceleration of a command, except for a cutting load, a detector G2 may be provided to detect the torque. Furthermore, a tool 11 may be fed by a number of feed axes and control units for the individual feed axes.

Figure 4A:
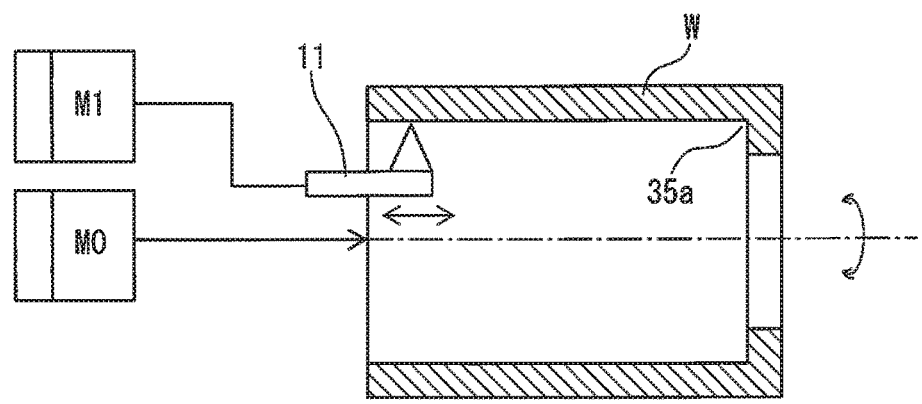
FIG. 4A is a drawing of a cylindrical workpiece and a tool.

FIG. 4A is a drawing of a cylindrical workpiece and a tool, different from FIG. 1. In FIG. 4A, a tool 11 cuts an inner peripheral surface of a cylindrical workpiece W, while oscillating along a generatrix of the inner peripheral surface. In this case, since only a feed axis M1 requires a motor to oscillate the tool 11, an oscillation command is generated for only the feed axis M1 in step S12.

Figure 4B:
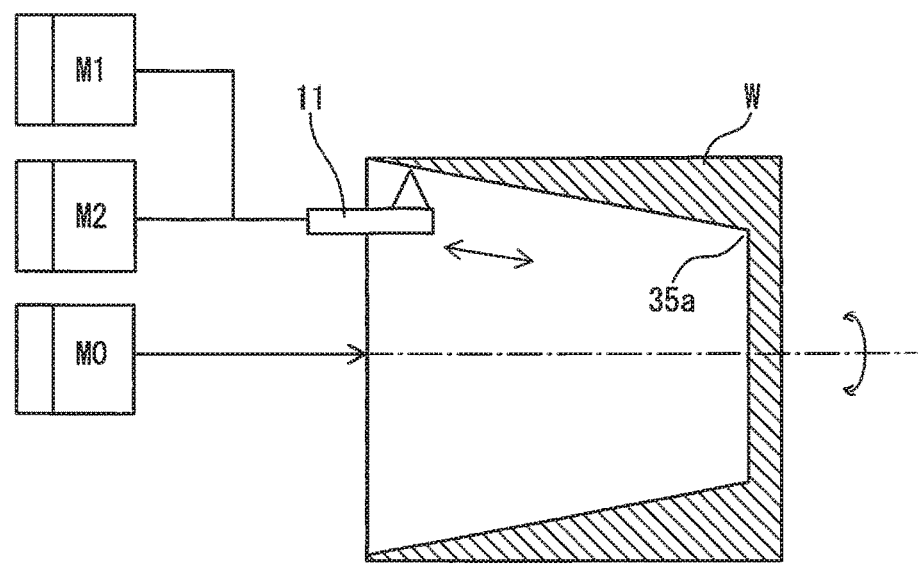
FIG. 4B is another drawing of a workpiece having a conical hollow portion and a tool.

In contrast, FIG. 4B is another drawing of a workpiece having a hollow portion in the shape of a circular truncated cone and a tool. In FIG. 4B, the tool 11 cuts an inner peripheral surface of a workpiece W having a hollow portion in the shape of a circular truncated cone, while oscillating along a generatrix of the inner peripheral surface. In this case, as described above, two feed axes M1 and M2 and two control units 26 each for each feed axis are required. In step S12, oscillation command generation units 23 of the control units 26 for the individual feed axes M1 and M2 generate oscillation commands for the two feed axes M1 and M2.

A case in which a tool 11 cuts an outer peripheral surface of a cylindrical column portion of a workpiece W will be described below. However, the following description is generally applied to the cases of FIGS. 3, 4A, and 4B.

Figure 5:
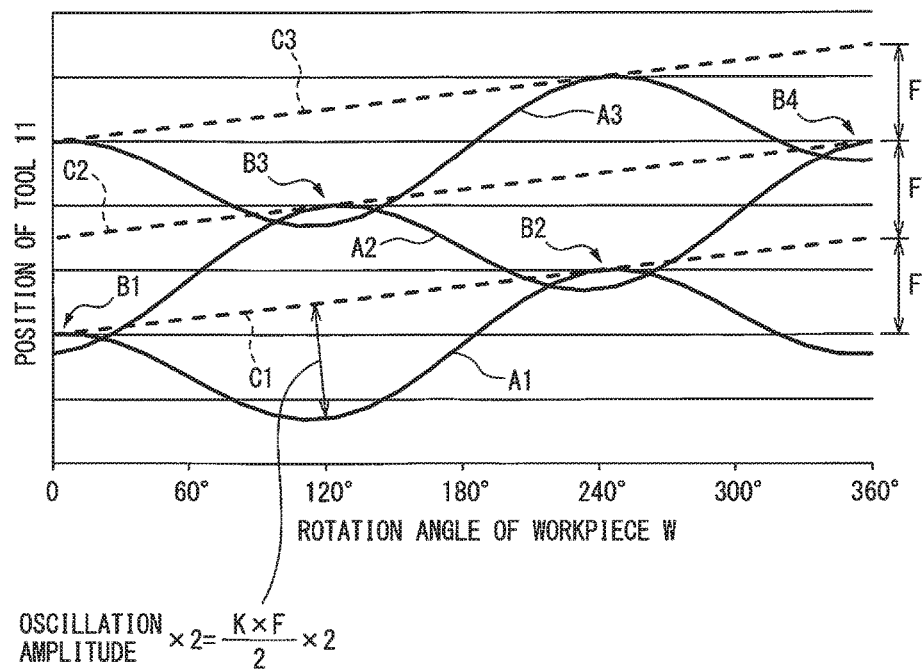
FIG. 5 is a graph illustrating the relationship between a feed amount and a rotation angle.

FIG. 5 is a graph illustrating the relationship between a feed amount and a rotation angle. In FIG. 5, a horizontal axis represents a rotation angle of a workpiece W, and a vertical axis represents a feed amount of a tool 11 in the direction of a central axis line of the workpiece W (i.e. the direction of a Z axis). In FIG. 5, a plurality of straight dashed lines C1, C2, C3, . . . extend in an oblique direction. As is apparent from FIG. 5, a vertical axis coordinate of an intersection point between the dashed line C1 and the vertical axis corresponds to a vertical axis coordinate of a start point of the next dashed line C2. In the same manner, a vertical axis coordinate of an intersection point between the dashed line C2 and the vertical axis corresponds to a vertical axis coordinate of a start point of the next dashed line C3. The linear dashed lines C1, C2, C3, . . . represent a track of the tool 11 on the workpiece W, in the case of having no oscillation command. On the other hand, curves A1, A2, A3, . . . represent a track of the tool 11 on the workpiece W, in the case of having an oscillation command. In other words, the dashed lines C1, C2, C3, and the like represent only a position command (original command value) before addition of the oscillation command. The curves A1, A2, A3, and the like represent a position command after addition of the oscillation command. Therefore, the curves A1, A2, and A3 represent a command obtained by adding the cosine oscillation command to the position command represented by the dashed lines C1, C2, and C3.

The curve A1 is a track of the tool 11 during a first rotation of the workpiece W. The curve A2 is a track of the tool 11 during a second rotation of the workpiece W. The curve A3 is a track of the tool 11 during a third rotation of the workpiece W. For the sake of simplicity, tracks of the workpiece W during fourth or more rotations are omitted in the illustration.

In step S12 of FIG. 2, an oscillation command generation unit 23 (refer to FIG. 6) of a control unit 26 generates an oscillation command as follows. A position command generation unit 22 determines a position command (dashed lines C1, C2, and C3) of a feed axis M1. The oscillation command generation unit 23 determines an oscillation frequency of a cosine oscillation command, to generate a command represented by curves A1, A2, and A3, which are based on the dashed lines C1, C2, and C3. The oscillation frequency corresponds to a value of the term of S/60×I in Equation (1) described later.

To determine the oscillation frequency, as illustrated in FIG. 5, an initial phase of a cosine curve based on a certain dashed line, e.g. an initial phase of the cosine curve A2 based on the dashed line C2, is preferably half a period out of phase with respect to an initial phase of a cosine curve based on the preceding dashed line, e.g. an initial phase of the cosine curve A1 based on the dashed line C1. This is because when the initial phases of the cosine curves are half a period out of phase with each other, the oscillation command has a minimized oscillation amplitude, and as a result, cutting chips are shredded most efficiently.

Then, the oscillation command generation unit 23 determines an oscillation amplitude of the oscillation command, in order to generate a command represented by the curves A1, A2, and A3 based on the dashed lines C1, C2, and C3. The oscillation amplitude corresponds to a value of the term of K×F/2 in Equation (1) described later. In FIG. 5, the curve A1 and the curve A2 overlap each other at a portion B1 having a rotation angle of approximately 0°, and at a portion B2 having a rotation angle of approximately 240°. As is apparent from FIG. 5, at the portions B1 and B2, a maximum value of the curve A1 based on the dashed line C1 is higher than a minimum value of the curve A2 based on the dashed line C2. In other words, the oscillation command generation unit 23 preferably determines an oscillation amplitude such that the anterior curve A1 and the posterior curve A2 partly overlap each other. The curves A1, A2, and A3 have a constant feed speed, and therefore have the same oscillation amplitude of the oscillation command.

When the tool 11 machines the workpiece W along the track of the curve A2, the tool 11 is out of touch with the workpiece W at the overlap portions B1 and B2, so the workpiece W is not machined thereat. In this embodiment, since the overlap portions appear in a cyclic manner, so-called intermittent cutting can be performed. In the example of FIG. 5, a cutting chip is produced at each of the portions B1 and B2 by the operation along the curve A2. In other words, in the curve A2 of the second rotation, two cutting chips are produced. Owing to the cyclic intermittent cutting, vibration cutting can be performed.

Furthermore, the curve A3 based on the dashed line C3 has the same shape as the curve A1. The curve A2 and the curve A3 overlap at a portion B3 having a rotation angle of approximately 120°, and at a portion B4 having a rotation angle of approximately 360°. A cutting chip is produced at each of the portions B3 and B4 by operation along the curve A3. In other words, in the curve A3 of the third rotation, two cutting chips are produced. Thereafter, two cutting chips are produced per rotation of the workpiece W. However, no cutting chip is produced by the first rotation.

By determining the oscillation frequency and the oscillation amplitude in this manner, the oscillation command generation unit 23 (refer to FIG. 6) of the control unit 26 produces an oscillation command (step S12).

For example, an oscillation command is represented by the following equation.

$$\text{Oscillation command} = (K \times F/2) \times \cos(2\pi \times S/60 \times I \times t) - (K \times F/2) \quad \text{Equation (1)}$$

In Equation (1), K represents an oscillation amplitude magnification, F represents a feed amount of a tool 11 per rotation of a workpiece W, i.e. a feed amount per rotation [mm/rev], S represents a rotation speed [min$^{-1}$] or [rpm] about a central axis line of the workpiece W, and I represents an oscillation frequency magnification.

An oscillation frequency corresponds to the term of S/60×I in Equation (1), and an oscillation amplitude corresponds to the term of K×F/2 in Equation (1). However, the oscillation amplitude magnification K is a number of 1 or more, and the oscillation frequency magnification I is a non-integer larger than zero (for example, a positive non-integer such as 0.5, 0.8, 1.2, 1.5, 1.9, 2.3, . . . ). The oscillation amplitude magnification K and the oscillation frequency magnification I are constants (in the example of FIG. 5, I is 1.5).

The reason why the oscillation frequency magnification I is not an integer is that, when an oscillation frequency is exactly the same as the number of rotations of a workpiece W about its central axis line, overlap portions B1, B2, B3, B4, and the like cannot be produced, and hence the effect of shredding cutting chips, owing to oscillation cutting, cannot be obtained.

According to Equation (1), in an oscillation command, the term of (K×F/2) is subtracted, as an offset value, from cosine curves representing a position command based on dashed lines C1, C2, and C3. Therefore, a positional track of a tool 11 based on a command value, which is obtained by adding the oscillation command to a position command, can be controlled, while a position represented by the position command is set as an upper limit in a machining feed direction of the tool 11. Therefore, in FIG. 5, the curves A1, A2, A3, and the like do not exceed the dashed lines C1, C2, C3, and the like in the direction of +Z axis (i.e. the machining feed direction of the tool 11).

Furthermore, as is apparent from the curve A1 of FIG. 5, an oscillation command represented by Equation (1) does not have large oscillation from the beginning in the machining feed direction of the tool 11, at a machining start point (the position of 0° in the horizontal axis) of the tool 11.

An initial value of each of the parameters (K and I in Equation (1)) to be adjusted to determine an oscillation frequency and an oscillation amplitude is stored in a machining condition memory unit 29, before actuation of a machine tool 10. The rotation speed (S) of a workpiece W is stored in advance as a machining condition in the machining condition memory unit 29. The feed amount F per rotation can be calculated from the rotation speed (S) and a position command generated by a position command generation unit 22.

After that, in step S13, the control unit 26 calculates a positional deviation, i.e. the difference between the position command generated and provided by the position command generation unit 22 illustrated in FIG. 1 and the actual position of the feed axis M1, and adds the oscillation command to the positional deviation to obtain a composite command.

Then, in step S14 of FIG. 2, the control unit 26 controls the feed axis M1 based on the composite command. A main spindle M0 is controlled by the control device 20 in accordance with the rotation speed (S) of the workpiece W stored in the machining condition memory unit 29. In this embodiment, shredding conditions for the workpiece W can be determined based on the machining conditions of the workpiece W, before actually cutting the workpiece W, without the need for generating a table of oscillation cutting information in advance.

By the way, when a drive mechanism for a tool 11 has a backlash, or the drive mechanism has low stiffness, a control gain is set high to improve servo responsiveness. However, the high control gain causes the occurrence of vibration, and therefore position accuracy of the tool 11 becomes unstable. For example, even if a feed axis M1 is driven based on a command value corresponding to the curves A1, A2, A3, and the like, the actual position of the tool 11 may not completely track the curves A1, A2, A3, and the like. In this case, if the actual position of the tool 11 does not coincide with the command value, such as the curves A1, A2, A3, and the like, in the overlap portions B1, B2, B3, B4, and the like illustrated in FIG. 5, intermittent cutting is not performed, and as a result, cutting chips are not formed favorably.

Therefore, in this embodiment, as illustrated in step S15 of FIG. 2, the ability to track an oscillation command is improved using learning control. The learning control is a control method by which the ability to track "a fixed cyclic command of a repeat pattern" is improved, and a positional deviation can be reduced more in the second cycle than in the first cycle, and more in the third cycle than in the second cycle, . . . , so as to be reduced as the cycle repeats. To be more specific, by learning a positional deviation in a predetermined number of oscillation periods of a workpiece W and a tool 11, and using the positional deviation as a correction amount, a cyclic increase in the positional deviation, due to the oscillation command, is prevented.

As a result, the actual position of the tool 11 gradually approaches the curves A1, A2, A3, and the like of the command value, and finally coincides with the curves A1, A2, A3, and the like of the command value. In this case, since the curves A1, A2, A3, and the like of the command value have the overlap portions B1, B2, B3, B4, and the like, intermittent cutting occurs with reliability, and the shredded cutting chips can be produced with reliability.

A learning range for learning control has an upper limit. When the oscillation frequency exceeds the upper limit, learning does not converge and a positional deviation remains. Thus, cutting chips are not produced favorably. Therefore, in this embodiment, it is required to calculate an optimal oscillation frequency in a range capable of performing learning control.

To be more specific, in the same manner as a method for reducing torque, adjusting (elongating) the length of cutting chips, as described later, allows reducing an oscillation frequency of an oscillation command within a learning range. As a matter of course, if machining conditions are changeable, the rotation speed of a main spindle M0 (i.e. the rotation speed of a workpiece W) may be reduced.

In the oscillation cutting according to this embodiment, by calculating an optimal oscillation frequency and an optimal oscillation amplitude, a required torque can be minimized. On the other hand, even if the required torque is minimized, torque saturation is a possible phenomenon and should be avoided. Furthermore, applying learning control tends to increase and saturate the torque. Therefore, in this embodiment, the optimal oscillation frequency and the optimal oscillation amplitude have to be calculated within the range of having no torque saturation.

By the way, an oscillation amplitude is preferably as small as possible. The lower the oscillation frequency, the longer cutting chips are produced. At this time, torques required of feed axes M1, M2, and the like become low. On the contrary, when the oscillation amplitude is large, torques required of the feed axes M1, M2, and the like become high. When an oscillation frequency is high, cutting chips become short, and torques required of the feed axes M1, M2, and the like become high.

When an operator desires cutting chips of a desired length, the operator inputs the desired length of the cutting chips to an oscillation command generation unit 23. Thus, the oscillation command generation unit 23 generates an oscillation frequency and an oscillation amplitude, based on the desired length of the cutting chips. For example, when short cutting chips are required, a workpiece W is prevented from being damaged. When long cutting chips are required, reduced torques allow a reduction in a load on a tool 11, and a reduced learning range facilitates convergence of learning.

Figure 6:
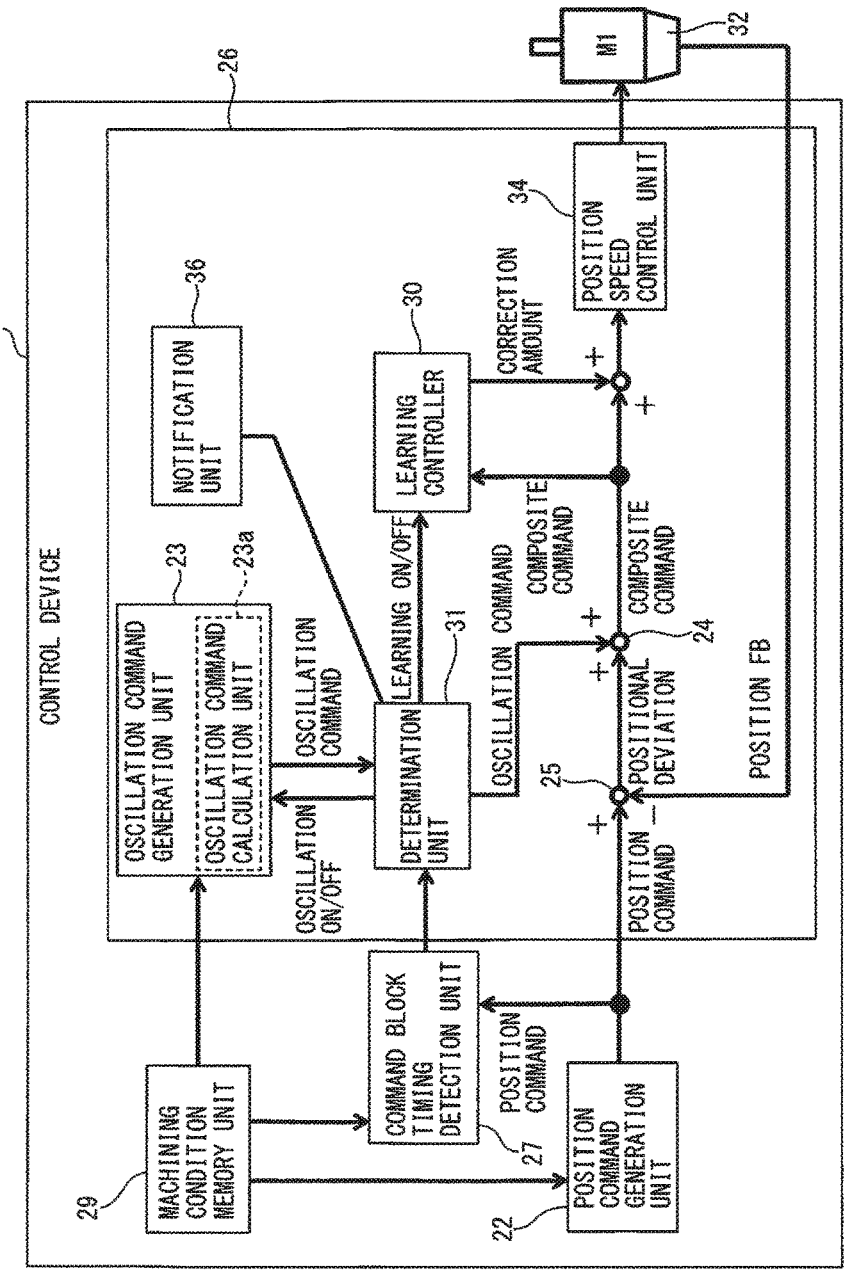
FIG. 6 is a block diagram illustrating a concrete example of the control device having a learning control function.

FIG. 6 is a block diagram illustrating a concrete example of a control device 20 having the above-described learning control function.

A control device 20 illustrated in FIG. 6 includes a machining condition memory unit 29, a position command generation unit 22, a control unit 26 (feed axis control unit), and a command block timing detection unit 27. The machining condition memory unit 29, the position command generation unit 22, and the command block timing detection unit 27 may be provided in a host computer (not illustrated), such as an NC device, connected to the control device 20.

The control unit 26 includes an oscillation command generation unit 23, an adder 24, a subtractor 25, a learning controller 30, a determination unit 31, a position speed control unit 34, and a notification unit 36. The oscillation command generation unit 23 includes an oscillation command calculation unit 23a that calculates an oscillation command using above Equation (1). A feed axis M1 for shifting a tool 11 in a machining feed direction is installed with an encoder 32 to detect the rotation position of the feed axis M1.

The position command generation unit 22 illustrated in FIG. 6 generates a position command that designates the position of the tool 11 in the machining feed direction on the feed axis M1, based on the rotation speed of a workpiece W and the feed speed of the tool 11 stored in the machining condition memory unit 29, and transmits the position command to the subtractor 25 at established time intervals. The established time intervals may be control cycles (sampling cycles) of the control unit 26, or other cycles.

The subtractor 25 calculates a positional deviation that is the difference between the position command transmitted from the position command generation unit 22 and a position feedback value (position FB) outputted from the encoder 32 of the feed axis M1, and transmits the positional deviation to the adder 24.

Furthermore, the oscillation command generation unit 23 calculates an oscillation command based on above Equation (1), and transmits the oscillation command to the adder 24 at the established time intervals. The oscillation command is calculated by the oscillation command calculation unit 23a of the oscillation command generation unit 23. To be more specific, the oscillation command calculation unit 23a receives the rotation speed (S) of the workpiece W stored in the machining condition memory unit 29 and the position command of the feed axis M1 generated by the position command generation unit 22, and calculates a feed amount (F) of the tool 11 per rotation from the position command and the rotation speed (S). The oscillation command calculation unit 23a calculates an oscillation frequency and an oscillation amplitude of the oscillation command from above Equation (1), based on the feed amount of the tool 11 per rotation, the rotation speed (S) of the workpiece W, and the like. The oscillation command calculation unit 23a generates an oscillation command based on the calculated oscillation frequency and oscillation amplitude, and an elapsed time t from the start of oscillation cutting.

The adder 24 adds the oscillation command to the positional deviation outputted from the subtractor 25. At this time, the positional deviation and the oscillation command are inputted to the adder 24 and added up in a synchronous manner at the established time intervals. The adder 24 transmits a composite command (position command value), which is obtained by adding the oscillation command to the positional deviation, to the position speed control unit 34.

The position speed control unit 34 generates a speed command and a torque command based on the composite command, and supplies the speed command and the torque command for the feed axis M1. Based on the commands, the feed axis M1 is controlled. When the feed axis M1 rotates, the actual position of the feed axis M1 is fed back from the encoder 32 installed in the feed axis M1 to the subtractor 25. When there is no difference between the position command value and the position feedback value by the composite command, the actual position of the feed axis M1 has reached the command position.

The composite command is inputted to a learning controller 30. The learning controller 30 repeatedly calculates a correction amount based on an oscillation phase, which is calculated from the oscillation command, and the composite command, and corrects the composite command in order to improve the ability to track a cyclic operation.

The learning control is control for improving the ability to track a cyclic command, by correcting a shift command using an integral deviation until an immediately preceding learning cycle.

Figure 7:
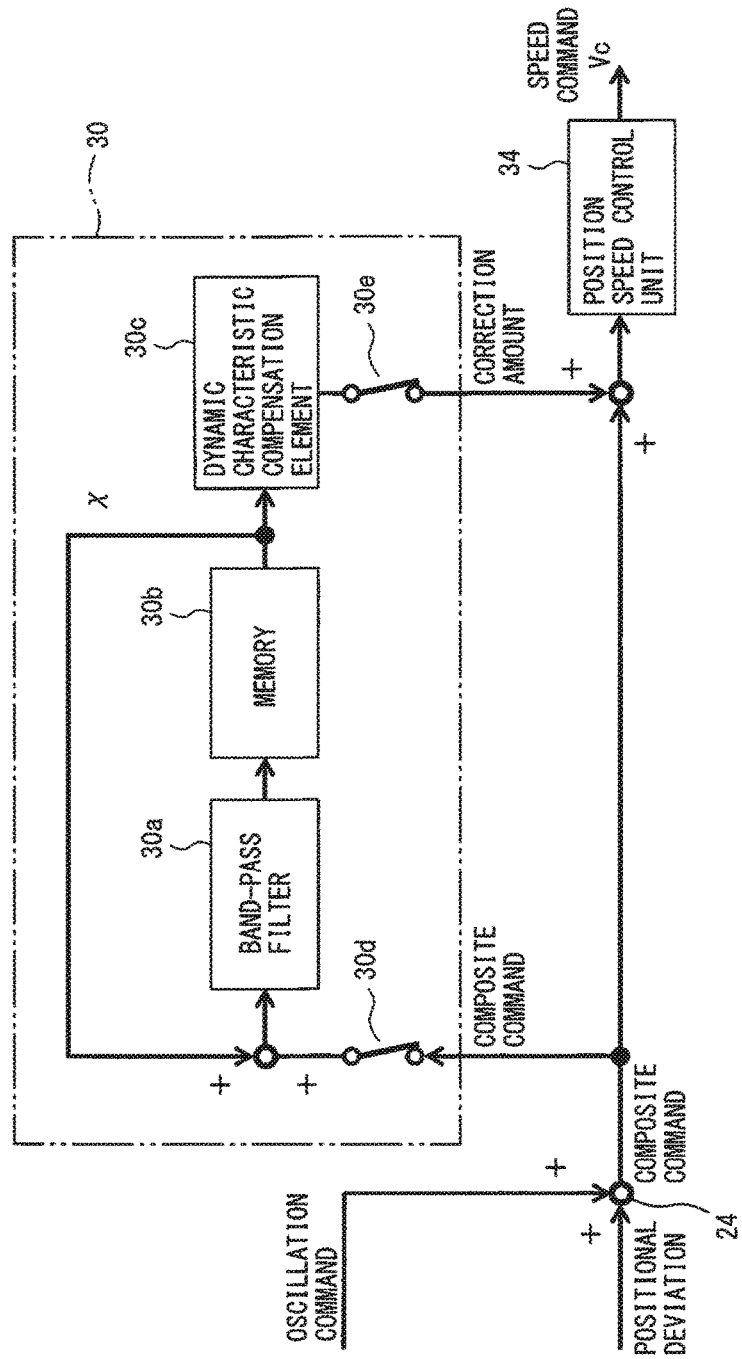
FIG. 7 is a block diagram illustrating an example of the configuration of a learning controller illustrated in FIG. 6.

FIG. 7 is a block diagram illustrating an example of the configuration of the learning controller 30 illustrated in FIG. 6.

The composite command outputted from the adder 24 is inputted to the learning controller 30 at the established time intervals. Since the composite command includes the difference between the position command and the position feedback value, the composite command inputted to the learning controller 30 is the same as a positional deviation to be generally inputted to a learning controller. In the learning controller 30, data of one oscillation period (one learning cycle) is stored in a memory 30b on a phase-by-phase basis. Each phase (referred to as an oscillation phase) is calculated by converting a cycle calculated from the oscillation frequency of the oscillation command into a cycle in a rotation angle, and dividing the cycle in the rotation angle by a certain division number. The learning controller 30 calculates a deviation in each phase stored in the memory 30b, from the oscillation phase calculated from the oscillation command and the inputted composite command (deviation), and adds the deviation to the data of each phase stored in the memory 30b. The series of operations, as described above, allows calculating an integral deviation in each phase in a repeated manner.

A dynamic characteristic compensation element 30c compensates for a phase delay of a control target in the integral deviation stored in the memory 30b, and the integral deviation becomes a correction amount of each control cycle of the control unit 26 in accordance with time. The correction amount is added to the composite command immediately before being inputted to the position speed control unit 34, as a correction amount. The position speed control unit 34 generates and outputs a speed command Vc, based on the composite command after the correction amount is added.

As described above, in the learning controller 30, the integral deviation of each phase is calculated repeatedly, and the correction amount in which the dynamic characteristic compensation element 30c compensates for the delay of the control target is added to the composite command. Therefore, while the cyclic operation, i.e. the oscillation of the tool 11 in the specific cycles, is repeated, the composite command (deviation) to be inputted to the learning controller 30 can converge on zero. In short, the tool 11 can oscillate as commanded by the oscillation command.

Therefore, even if servo responsiveness is difficult to improve, owing to the presence of a backlash in a drive mechanism for a tool 11 or low stiffness of the drive mechanism, the oscillation cutting can be performed with high accuracy, and cutting chips can be shredded with high reliability. In the above-described embodiment of the learning control, one oscillation period is set as the learning cycle, and learning is performed to calculate the correction amount for the composite command of each oscillation period, but in the present invention, a certain number of oscillation periods, other than one oscillation period, may be set as the learning cycle.

By the way, just as with the workpiece W illustrated in FIG. 1, the oscillation cutting may be performed on a workpiece having a projection 35 and a corner 35a in at least a part of an outer peripheral surface of the workpiece, and having a shape that the projection 35 is present forward in the machining feed direction of the tool 11. In this case, although the oscillation cutting is performed on the outer peripheral surface of the workpiece W, the interference between the tool 11 and the projection 35 has to be prevented, so accuracy in the position of the tool 11 in the machining feed direction, with respect to a machining stop position, is important. If the tool is beyond the machining stop position, the defect that the tool 11 cuts into the projection 35, i.e. the problem of a so-called overshoot, occurs. This problem occurs not only in the workpiece having the shape of FIG. 1, but also in other workpieces. The problem occurs in all the workpieces that are rotationally symmetrical to their central axis lines, and have corners 35a that are not continuous from radially outermost portions of the workpieces, inside the radially outermost portions in a radial direction in section along the central axis lines. The problem occurs in, for example, the workpieces W illustrated in FIGS. 1, 4A, and 4B. The corner 35a includes a portion having a certain curvature or a tapered portion.

The defect of the overshoot can occur in the workpiece W, even if learning control is applied to the oscillation cutting, as described above. This is because the learning control is control in which a correction amount calculated in the immediately preceding learning cycle of a repeated oscillation pattern is applied to a command value. In other words, a position command value determined such that the tool 11 is not beyond the machining end point is outputted to the control unit 26 (FIG. 6) of the control device 20, as a composite command, a correction amount calculated in the immediately preceding learning cycle of the oscillation pattern is applied to the position command value, and therefore an overshoot may not be prevented.

The machining program stored in the machining condition memory unit 29 includes a plurality of shift commands called command blocks. A robot shifts a workpiece or a tool to a certain position based on a certain command block, and shifts the workpiece or the tool to the next position based on the next command block. When learning control is applied to the oscillation cutting, a cut may appear, owing to an overshoot or a tracking delay, between the shifts by the command blocks.

Therefore, in the control device 20 according to the embodiments, the command block timing detection unit 27 detects arbitrary timing between command blocks, and oscillations of the feed axes M1 and M2 are stopped in the timing.

To be more specific, the command block timing detection unit 27 reads a plurality of command blocks from a machining program, and detects arbitrary timing between the command blocks based on the contents of the adjacent two command blocks. The determination unit 31 is notified of the arbitrary timing. The determination unit 31 compares a current time with the detected arbitrary timing. When the current time is in the detected arbitrary timing, an oscillation stop command is issued. The oscillation stop command includes a command to disable learning control, or both of the command to disable learning control and a command to set an oscillation command at zero. Thus, the determination unit 31 notifies the learning controller 30 of the command to disable learning control, or notifies the oscillation command generation unit 23 of the command to set the oscillation command at zero, as well as notifies the learning controller 30 of the command to disable learning control.

Providing the determination unit 31 allows preventing the occurrence of the overshoot. Note that, a signal line from the encoder 32 to the determination unit 31 is omitted in FIG. 6.

The oscillation may continue stopping for a certain first period of time or a certain first number of oscillations from the arbitrary timing. The stop of oscillation may be started with a delay of a certain second period of time or a certain second number of oscillations. The determination unit 31 may be notified of the arbitrary timing a certain third time or a third oscillation number before. These methods may be used in combination.

Any method may be used as a method for disabling learning control. As illustrated in FIG. 7, a first switch 30d is provided in an input line through which a composite command outputted from the adder 24 is inputted to the learning controller 30, and a second switch 30e is provided in an output line through which a correction amount is outputted from the dynamic characteristic compensation element 30c. For example, upon receiving a command to disable learning control from the determination unit 31, the learning controller 30 may turn off the first switch 30d and delete an integral deviation of one learning cycle stored in the memory 30b.

Alternatively, upon receiving a command to disable learning control from the determination unit 31, the learning controller 30 may concurrently turn off the first switch 30d and the second switch 30e. According to this configuration, even if the learning controller 30 is turned off, an integral deviation of one learning cycle stored in the memory 30b can be maintained. The above method and configuration for disabling learning control are just examples, and as a matter of course, the present invention is not limited thereto.

Figure 8:
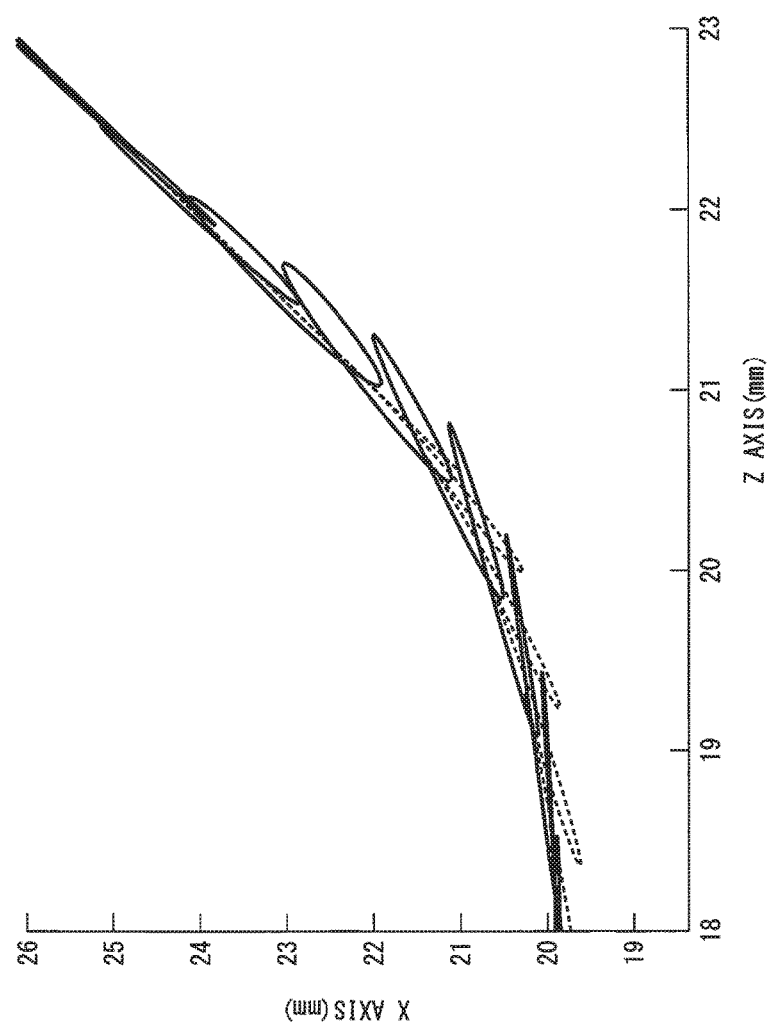
FIG. 8 is a graph illustrating the relationship between a Z axis and an X axis according to prior art.
Figure 9:
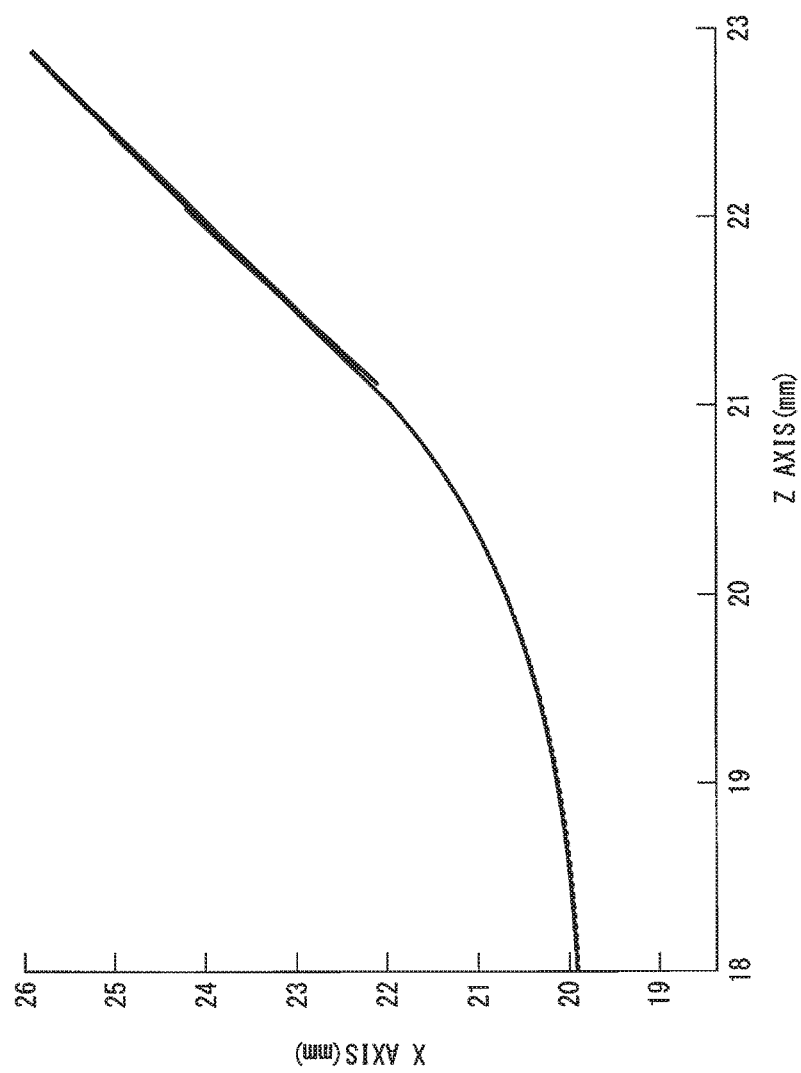
FIG. 9 is a graph illustrating the relationship between a Z axis and an X axis according to an embodiment.

FIG. 8 is a graph illustrating the relationship between the Z axis and the X axis according to prior art. FIG. 9 is a graph illustrating the relationship between the Z axis and the X axis according to the embodiment. The prior art illustrated in FIG. 8 does not have a command block timing detection unit 27 and a determination unit 31. In FIGS. 8 and 9, the horizontal axes correspond to the Z axes, and the vertical axes correspond to the X axes. In the drawings, dashed lines represent a position command, and solid lines represent an actual position detected by the encoder 32 or the like.

In FIG. 8, there is a divergence between the position command and the actual position in the vicinity of a machining end point. Thus, a workpiece W may have a cut therein, owing to an overshoot or a tracking delay. In contrast, in FIG. 9, oscillation is stopped by issuing a command to disable learning control, or by issuing a command to set an oscillation command at zero, as well as issuing the command to disable learning control. Thus, no overshoot and no tracking delay occur, and as a result, it is possible to prevent the occurrence of a cut in a workpiece W.

FIG. 10 is a flowchart illustrating an example of the operation of the control device illustrated in FIG. 6.

First, in step S21, the control device 20 determines the presence or absence of an oscillation cutting start command. When the oscillation cutting start command is present, oscillation cutting is started. When the command is absent, machining of a workpiece W is ended.

When the oscillation cutting is started, the position command generation unit 22 illustrated in FIG. 6 generates a position command for the feed axis M1 based on machining conditions described in a machining program stored in the machining condition memory unit 29, e.g. the rotation speed of the workpiece W and the feed speed of the tool 11, and transmits the position command to the control unit 26. Subsequently, the command block timing detection unit 27 obtains the position command for the feed axis M1 (step S22). At this time, the command block timing detection unit 27 may obtain the actual position of the feed axis M1 operated by the position command from the encoder 32.

Then, in step S23, the command block timing detection unit 27 detects arbitrary timing between command blocks of the machining program, and notifies the determination unit 31 of the timing. Then, in step S24, the oscillation command calculation unit 23a of the oscillation command generation unit 23 calculates an oscillation command based on the rotation speed of the workpiece W read from the machining condition memory unit 29, and the position command obtained from the position command generation unit 22. The oscillation command is transmitted to the adder 24.

In step S25, the adder 24 adds the oscillation command to a positional deviation, which is the difference between the position command from the position command generation unit 22 and the actual position (position FB) of the feed axis M1, to generate a composite command.

Then, in step S26, the determination unit 31 obtains a current time, and determines whether or not the current time is in the detected arbitrary timing. When the current time is in the detected arbitrary timing, the operation proceeds to step S27, oscillation is determined to be stopped, and an oscillation stop command is issued. To be more specific, the determination unit 31 issues a command to disable learning control to the learning controller 30, or issues a command to set the oscillation command at zero to the oscillation command generation unit 23, as well as issues the command to disable learning control to the learning controller 30.

The oscillation stop command may be issued for a certain first period of time, or a certain first number of oscillations. After a lapse of the certain first period of time or the certain first number of oscillations, the oscillation stop command is canceled. Alternatively, the oscillation stop command may be issued with a delay of a certain second period of time or a certain second number of oscillations.

Figure 11A:
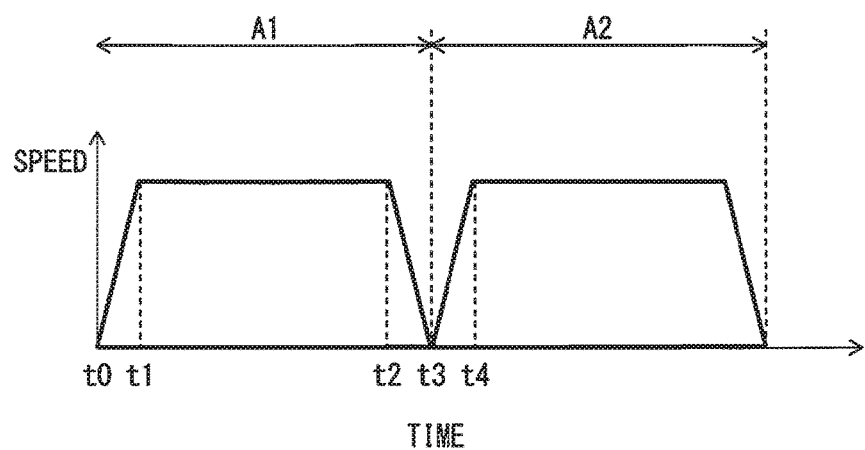
FIG. 11A is a graph illustrating the relationship between time and speed.

FIG. 11A is a graph illustrating the relationship between time and speed. In an anterior command block A1 illustrated in FIG. 11A, the robot 10 starts accelerating from a time t0, and reaches a maximum speed at a time t1. The robot 10 starts decelerating from a time t2, and the anterior command block A1 is ended at a time t3. In a posterior command block A2, the robot 10 starts accelerating from a time t3, and reaches a maximum speed at a time t4.

Figure 11B:
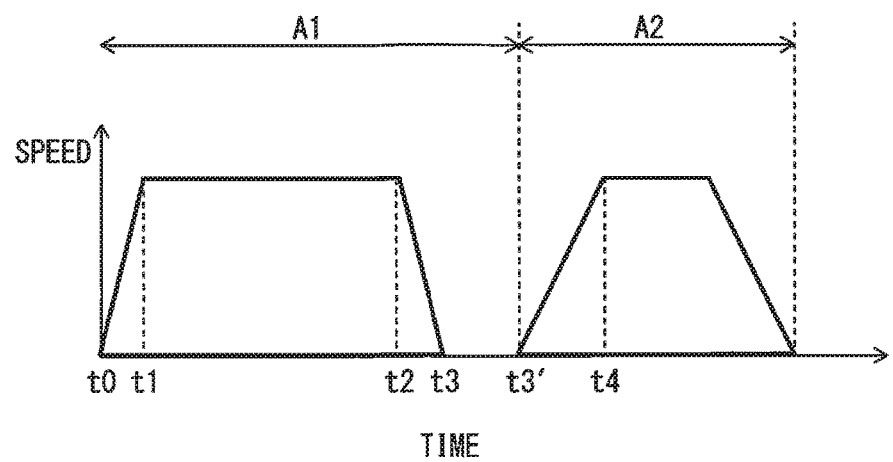
FIG. 11B is another graph illustrating the relationship between time and speed.

Furthermore, in FIG. 11B that is another graph illustrating the relationship between time and speed, in an anterior command block A1, the robot 10 starts decelerating at a time t2, and stops at a time t3, in the same manner. In a posterior command block A2, the robot 10 starts accelerating at a time t3' (t3<t3'), and reaches a maximum speed at a time t4. In other words, a time period (t3 to t3') between which the robot 10 stops is present in FIG. 11B.

Figure 11C:
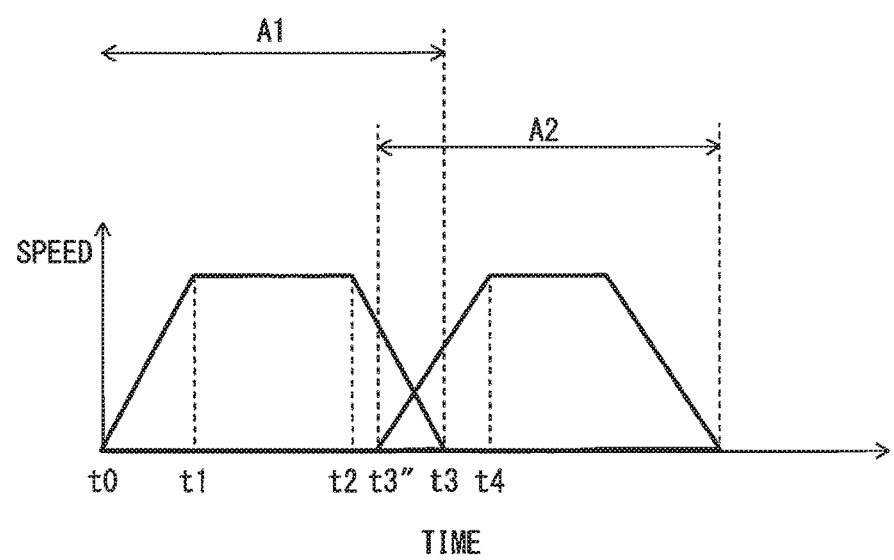
FIG. 11C is yet another graph illustrating the relationship between time and speed.

In FIG. 11C that is yet another graph illustrating the relationship between time and speed, in an anterior command block A1, the robot 10 starts decelerating at a time t2, and stops at a time t3, in the same manner. In a posterior command block A2, the robot 10 starts decelerating from a time t3" earlier than the time t3 (t2<t3"<t3), and reaches a maximum speed at a time t4. In other words, in FIG. 11C, the posterior command block A2 starts before the completion of the anterior command block A1, and the anterior command block A1 and the posterior command block A2 partly overlap. The command blocks A1 and A2 illustrated in FIGS. 11A to 11C are included in the scope of the present disclosure, and the present disclosure is applied thereto as follows:

The command block timing detection unit 27 may detect arbitrary timing in a time period (t2 to t4) between the start of deceleration in an anterior command block A1 of adjacent command blocks and the completion of acceleration in a posterior command block A2.

The determination unit 31 stops oscillation in accordance with a notification of the arbitrary timing. For example, the determination unit 31 may stop oscillation, after the start of deceleration in the anterior command block is detected, until the completion of acceleration in the posterior command block is detected. The command block timing detection unit 27 may notify the determination unit 31 of arbitrary timing between the command blocks, or arbitrary timing between the start of deceleration in the anterior command block and the completion of acceleration in the posterior command block, a certain third period of time or a certain third number of oscillations in advance. The oscillation can be thereby stopped immediately before the start of deceleration, or the advance notification allows even considering convergence timing of the oscillation stop.

In the next step S28, the learning controller 30 performs learning control in which a correction amount for the composite command is calculated based on an oscillation phase calculated from the oscillation command and the composite command, and is added to the composite command.

Then, in step S29, the presence or absence of an oscillation cutting end command is determined. When the oscillation cutting end command is present, machining of the workpiece W is completed. When the oscillation cutting end command is absent, a series of processing of steps S22 to S29 is repeated.

The determination unit 31 may disable learning control at the timing that the oscillation command outputted from the oscillation command generation unit 23 becomes zero. This timing corresponds to phases of 0°, 120°, 240°, and 360° illustrated in FIG. 5. Adopting this timing allows preventing a situation in which a shift of the tool 11 by a position command after addition of an oscillation command is largely and suddenly changed in its tracks to a shift of the tool 11 only by the position command. Therefore, a motor is not applied with a sudden load.

When the tool 11 is oscillated using a plurality of axes, such as feed axes M1 and M2 (for example, a taper machining), as illustrated in the examples of FIGS. 3 and 4B, both of the timing of setting an oscillation command at zero and the timing of disabling learning control are preferably synchronized in all of the axes.

For example, when taper machining is performed, as illustrated in FIGS. 3 and 4B, a control unit 26 is provided for each of feed axes M1 and M2. In this case, as illustrated in FIG. 6, the control unit 26 for each of the feed axes M1 and M2 includes an oscillation command generation unit 23, an adder 24, a subtractor 25, a learning controller 30, a determination unit 31, a position speed control unit 34, and a notification unit 36. As illustrated in FIG. 6, the determination unit 31 of the control unit 26 for the feed axis M1 is provided with the notification unit 36, and the determination unit 31 notifies the determination unit 31 of the control unit 26 (refer to FIG. 3) for the other feed axis M2 of a determination result of the determination unit 31 through the notification unit 36.

According to the notification function, when, in a control unit 26 of one of feed axes that perform oscillation cutting in conjunction with each other, a determination unit 31 disables learning control in response to prohibition against generating an oscillation command on an oscillation command generation unit 23, control units 26 for all of the other feed axes can set an oscillation command at zero and disable learning control in a synchronous manner.

In other words, when a control unit 26 is provided for each of feed axes, a determination unit 31 of the control unit 26 for each feed axis preferably sets an oscillation command at zero and disables learning control, in response to at least one of a self-decision to disable learning control and another decision to disable learning control notified by a determination unit 31 of another control unit 26.

The present invention is described above using the typical embodiment, but persons skilled in the art will recognize that the above modifications and various other modifications, omissions, and additions can be applied to the embodiment without departing from the scope of the present invention.

To solve at least one of objects of the present disclosure, various aspects and effects thereof can be provided as follows.

A first aspect provides a control device (20) for a machine tool (10) for machining an outer peripheral surface or an inner peripheral surface of a workpiece (W) using a tool (11), the control device controlling the machine tool (10) including a main spindle (M0) for relatively rotating the workpiece (W) and the tool (11) about a central axis line of the workpiece (W), and at least one feed axis (M1 or M2) for relatively feeding the tool (11) and the workpiece (W) along a generatrix of the outer peripheral surface or a generatrix of the inner peripheral surface of the workpiece (W), the control device includes:

a position command generation unit (22) for generating a position command for the feed axis (M1 or M2), based on a relative rotation speed between the workpiece (W) and the tool (11), and a relative feed speed between the tool (11) and the workpiece (W); and a feed axis control unit (26) for controlling the feed axis by the position command, wherein the feed axis control unit (26) includes an oscillation command generation unit (23) for generating an oscillation command for the feed axis (M1 or M2) based on the rotation speed and the position command, such that an oscillation frequency becomes a positive non-integer multiple of the rotation speed, and such that the tool (11) intermittently machines the workpiece (W), and the feed axis control unit (26) controls the feed axis (M1 or M2) based on a composite command obtained by adding the oscillation command to a positional deviation that is a difference between the position command and an actual position of the feed axis (M1 or M2), the control device (20) further includes a command block timing detection unit (27) for detecting arbitrary timing between adjacent command blocks, based on a machining program, including a plurality of command blocks, of the machine tool, and the feed axis control unit (26) further includes:

a learning controller (30) for performing learning control in which a correction amount of the composite command is calculated based on an oscillation phase calculated from the oscillation command, and the composite command, and the correction amount is added to the composite command; and a determination unit (31) for determining whether or not a current time is in the arbitrary timing between the adjacent command blocks, and for stopping oscillation of the feed axis based on the determination.

In a second aspect, according to the first aspect, the arbitrary timing between the adjacent command blocks is arbitrary timing in a time period between the start of deceleration in an anterior command block of the adjacent command blocks and the completion of acceleration in a posterior command block.

In a third aspect, according to the first or second aspect, when the determination unit determines that the current time is in the arbitrary timing between the adjacent command blocks, the determination unit stops oscillation of the feed axis for a certain first period of time, or a certain first number of oscillations.

In a fourth aspect, according to any one of the first to third aspects, when the determination unit determines that the current time is in the arbitrary timing between the adjacent command blocks, the determination unit delays stopping oscillation of the feed axis by a certain second period of time, or a certain second number of oscillations.

In a fifth aspect, according to any one of the first to fourth aspects, the command block timing detection unit notifies the determination unit of the arbitrary timing between the adjacent command blocks, a certain third period of time or a certain third number of oscillations in advance.

In a sixth aspect, according to any one of the first to fifth aspects, the determination unit stops oscillation of the feed axis only in a last machining pass.

In a seventh aspect, according to any one of the first to sixth aspects, stopping the oscillation command includes disabling the learning control, or setting the oscillation command at zero, as well as disabling the learning control.

In an eighth aspect, according to any one of the first to seventh aspects, the oscillation command generation unit (23) generates the oscillation command in which an oscillation amplitude is subtracted, as an offset value, from a cosine reference axis line.

In a ninth aspect, according to any one of the first to eighth aspects, the oscillation command generation unit (23) generates an oscillation frequency of the oscillation command based on the rotation speed, such that the oscillation command is half a period out of phase, whenever the workpiece (W) or the tool (11) makes one rotation, and generates an oscillation amplitude of the oscillation command based on the rotation speed and the position command.

In a tenth aspect, according to any one of the first to ninth aspects, the oscillation command generation unit (23) generates an oscillation frequency and an oscillation amplitude of the oscillation command, such that a torque of the feed axis (M1 or M2) does not exceed a predetermined value.

In an eleventh aspect, according to any one of the first to tenth aspects, the oscillation command generation unit (23) generates an oscillation frequency and an oscillation amplitude of the oscillation command, based on a control range of the learning control, such that learning converges.

In a twelfth aspect, according to any one of the first to eleventh aspects, the oscillation command generation unit (23) generates an oscillation frequency and an oscillation amplitude of the oscillation command, based on a desired length of a cutting chip produced by the tool (11) machining the workpiece (W).

In a thirteenth aspect, according to first to twelfth aspects, the workpiece has a corner that is not continuous from a radially outermost portion of the workpiece, inside the radially outermost portion in a radial direction, in a section along the central axis line.

Effects of the Aspects

According to the first and second aspects, since the oscillation is stopped, when the current time is in the arbitrary timing between the command blocks, neither overshoot nor tracking delay occurs. Therefore, it is possible to prevent the occurrence of a cut in the workpiece.

According to the third aspect, the oscillation can be stopped for the certain first period of time or the like, and the oscillation cutting can be started again after the stop of the oscillation.

According to the fourth aspect, oscillation can be stopped at an appropriate time for an operator.

According to the fifth aspect, since the determination unit is notified of the arbitrary timing between the command blocks in advance, the oscillation can be stopped even before the start of deceleration.

According to the sixth aspect, it is possible to prevent the occurrence of a cut in the workpiece after the completion of machining.

According to the seventh aspect, the oscillation can be stopped with reliability.

According to the eighth aspect, the position of the tool based on a command value, which is obtained by adding the oscillation command to the position command, can be controlled, while the position command, i.e. a target position in the machining feed direction of the tool, is set as an upper limit.

According to the ninth aspect, since the oscillation frequency of the oscillation command is half a period out of phase, whenever the workpiece or the tool makes one rotation, the oscillation amplitude can be minimized. As a result, the intermittent cutting can be performed with high efficiency.

According to the tenth aspect, when the feed axis is driven based on the position command after addition of the oscillation command, a torque of a motor can be prevented from being saturated.

According to the eleventh aspect, it is possible to obtain the further appropriate oscillation command.

According to the twelfth aspect, when short cutting chips are required, the workpiece is prevented from being damaged. When long cutting chips are required, a reduced torque allows a reduction in a load on the tool.

According to the thirteenth aspect, the workpiece having the corner can be appropriately machined by the oscillation cutting.

The present invention is described above using the typical embodiment, but persons skilled in the art will recognize that the above modifications and various other modifications, omissions, and additions can be applied to the embodiment without departing from the scope of the present invention.

What is claimed is:

1. A control device for controlling a machine tool for machining an outer peripheral surface or an inner peripheral surface of a workpiece using a tool, the machine tool including a main spindle for relatively rotating the workpiece and the tool about a central axis line of the workpiece, and at least one feed axis for relatively feeding the tool and the workpiece along a generatrix of the outer peripheral surface or the inner peripheral surface of the workpiece, the control device comprising:
   a position command generation unit for generating a position command for the feed axis, based on a relative rotation speed between the workpiece and the tool, and a relative feed speed between the tool and the workpiece; and
   a feed axis control unit for controlling the feed axis by the position command, wherein
   the feed axis control unit includes an oscillation command generation unit for generating an oscillation command for the feed axis based on the rotation speed and the position command, such that an oscillation frequency becomes a positive non-integer multiple of the rotation speed, and such that the tool intermittently machines the workpiece, and the feed axis control unit controls the feed axis based on a composite command obtained by adding the oscillation command to a positional deviation that is a difference between the position command and an actual position of the feed axis,
   the control device further includes a command block timing detection unit for detecting arbitrary timing between adjacent command blocks, based on a machining program, including a plurality of command blocks, of the machine tool, and
   the feed axis control unit further includes:
      a learning controller for performing learning control in which a correction amount of the composite command is calculated based on an oscillation phase calculated from the oscillation command, and the composite command, and the correction amount is added to the composite command; and
      a determination unit for determining whether or not a current time is in the arbitrary timing between the adjacent command blocks, and for stopping oscillation of the feed axis based on the determination.

2. The control device according to claim 1, wherein the arbitrary timing between the adjacent command blocks is arbitrary timing in a time period between the start of deceleration in an anterior command block of the adjacent command blocks and the completion of acceleration in a posterior command block.

3. The control device according to claim 2, wherein when the determination unit determines that the current time is in the arbitrary timing between the adjacent command blocks, the determination unit stops oscillation of the feed axis for a certain first period of time, or a certain first number of oscillations.

4. The control device according to claim 2, wherein when the determination unit determines that the current time is in the arbitrary timing between the adjacent command blocks, the determination unit delays stopping oscillation of the feed axis by a certain second period of time, or a certain second number of oscillations.

5. The control device according to claim 2, wherein the command block timing detection unit notifies the determination unit of the arbitrary timing between the adjacent command blocks, a certain third period of time or a certain third number of oscillations in advance.

6. The control device according to claim 1, wherein the determination unit stops oscillation of the feed axis only in a last machining pass.

7. The control device according to claim 1, wherein stopping the oscillation command includes disabling the learning control, or setting the oscillation command at zero, as well as disabling the learning control.

8. The control device according to claim 1, wherein the oscillation command generation unit generates the oscillation command in which an oscillation amplitude is subtracted, as an offset value, from a cosine reference axis line.

9. The control device according to claim 1, wherein the oscillation command generation unit generates an oscillation frequency of the oscillation command based on the rotation speed, such that the oscillation command is half a period out of phase, whenever the workpiece or the tool makes one rotation, and generates an oscillation amplitude of the oscillation command based on the rotation speed and the position command.

10. The control device according to claim 1, wherein the oscillation command generation unit generates an oscillation frequency and an oscillation amplitude of the oscillation command, such that a torque of the feed axis does not exceed a predetermined value.

11. The control device according to claim 1, wherein the oscillation command generation unit generates an oscillation frequency and an oscillation amplitude of the oscillation command, based on a control range of the learning control, such that learning converges.

12. The control device according to claim 1, wherein the oscillation command generation unit generates an oscillation frequency and an oscillation amplitude of the oscillation command, based on a desired length of a cutting chip produced by the tool machining the workpiece.

13. The control device according to claim 1, wherein the workpiece has a corner that is not continuous from a radially outermost portion of the workpiece, inside the radially outermost portion in a radial direction, in a section along the central axis line.

* * * * *